United States Patent
Lo

(10) Patent No.: US 9,243,563 B2
(45) Date of Patent: Jan. 26, 2016

(54) GAS TURBINE ENGINE IN-BOARD COOLED COOLING AIR SYSTEM

(75) Inventor: Charles Lo, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 930 days.

(21) Appl. No.: 13/358,161

(22) Filed: Jan. 25, 2012

(65) Prior Publication Data

US 2013/0186102 A1 Jul. 25, 2013

(51) Int. Cl.
| | |
|---|---|
| F02C 7/18 | (2006.01) |
| F02C 7/141 | (2006.01) |
| F02K 3/115 | (2006.01) |
| F02C 7/12 | (2006.01) |
| B64D 33/02 | (2006.01) |
| F02K 3/105 | (2006.01) |
| F02K 3/06 | (2006.01) |

(52) U.S. Cl.
CPC ... *F02C 7/18* (2013.01); *F02C 7/12* (2013.01); *F02C 7/141* (2013.01); *F02C 7/185* (2013.01); *F02K 3/115* (2013.01); *B64D 2033/024* (2013.01); *F02K 3/06* (2013.01); *F02K 3/105* (2013.01); *Y02T 50/675* (2013.01)

(58) Field of Classification Search
CPC .............. F02C 7/14; F02C 7/18; F02C 7/185; F02C 6/08; F02C 7/141; F02K 9/50; F02K 3/02; F02K 3/105; F02K 3/115; F02K 3/06; B64D 2033/024; Y02T 50/675
USPC .......................... 60/266, 267, 785, 782, 226.1
See application file for complete search history.

(56) References Cited

U.S. PATENT DOCUMENTS

| | | | | |
|---|---|---|---|---|
| 3,528,250 | A | * | 9/1970 | Johnson .......................... 60/762 |
| 3,842,597 | A | * | 10/1974 | Ehrich ......................... 60/226.1 |
| 3,964,257 | A | | 6/1976 | Lardellier |
| 4,254,618 | A | * | 3/1981 | Elovic .......................... 60/226.1 |
| 5,167,117 | A | * | 12/1992 | Herzog et al. ................... 60/204 |
| 5,269,135 | A | * | 12/1993 | Vermejan et al. ............. 60/226.1 |
| 5,392,614 | A | * | 2/1995 | Coffinberry .................... 62/402 |
| 5,438,823 | A | * | 8/1995 | Loxley et al. ................ 60/39.08 |
| 5,918,458 | A | * | 7/1999 | Coffinberry et al. ............ 60/785 |
| 7,587,899 | B2 | | 9/2009 | Song et al. |

(Continued)

OTHER PUBLICATIONS

USPTO Office Action, Notification Date Aug. 7, 2014; U.S. Appl. No. 13/316,960.

(Continued)

*Primary Examiner* — Gerald L Sung
*Assistant Examiner* — Alain Chau
(74) *Attorney, Agent, or Firm* — Ingrassia Fisher & Lorenz, P.C.

(57) ABSTRACT

A system for supplying turbine cooling air flow includes a turbofan engine, a heat exchanger, and a door. The turbofan engine includes an engine case that has an inner volume within which at least a gas turbine engine is mounted, and a bypass flow passage that is defined by an outer fan duct and an inner fan duct and that is configured to direct fan air flow therethrough. The heat exchanger is disposed within the turbofan engine, is coupled to receive fluid and cooling air from the bypass flow passage, and is configured to transfer heat between fluid and the cooling air. The door is movably mounted in the turbofan engine and is movable between a closed position, in which the cooling air will not flow through the heat exchanger, and an open position, in which the cooling air may flow through the heat exchanger.

4 Claims, 6 Drawing Sheets

(56) References Cited

U.S. PATENT DOCUMENTS

| | | | |
|---|---|---|---|
| 7,861,512 B2 | 1/2011 | Olver et al. | |
| 7,861,968 B2 | 1/2011 | Parikh et al. | |
| 7,926,261 B2* | 4/2011 | Porte | 60/266 |
| 2008/0095611 A1* | 4/2008 | Storage et al. | 415/116 |
| 2008/0230651 A1* | 9/2008 | Porte | 244/118.5 |
| 2009/0007567 A1* | 1/2009 | Porte | F02C 7/141 60/785 |
| 2009/0056307 A1 | 3/2009 | Mons | |

OTHER PUBLICATIONS

USPTO Notice of Allowance, Notification Date Feb. 9, 2015; U.S. Appl. No. 13/316,960.

USPTO Final Office Action, Notification Date Nov. 21, 2014; U.S. Appl. No. 13/316,960.

USPTO Office Action, Notification date Jun. 19, 2015; for U.S. Appl. No. 13/427,771.

USPTO Notice of Allowance and Fee(s) Due for U.S. Appl. No. 13/427,771 dated Oct. 23, 2015.

* cited by examiner

GAS TURBINE ENGINE IN-BOARD COOLED COOLING AIR SYSTEM

STATEMENT REGARDING FEDERALLY SPONSORED RESEARCH OR DEVELOPMENT

This invention was made with Government support under FA8650-09-D-2925-003 awarded by the U.S. Air Force. The Government has certain rights in this invention.

TECHNICAL FIELD

The present invention generally relates to cooled cooling air systems for gas turbine engines, and more particularly relates to a system for selectively directing air flow to an in-board mounted heat exchanger to selectively cool turbine cooling air in a turbofan gas turbine propulsion engine.

BACKGROUND

In the field of gas turbine technology a great deal of effort has been, and continues to be, directed toward improving thermodynamic efficiency by operating gas turbine engines at ever increasing temperatures. These temperatures may exceed the temperatures that some materials within the turbine engine structure can normally tolerate. As such, cooling air may be provided to various turbine engine components using cooling air extracted from other parts of the engine. For example, in some gas turbine engines cooling air is extracted from a plenum at the discharge of the compressor, and is then directed to certain portions of the turbine.

For some gas turbine engines, the air that is extracted from the engine for turbine cooling may be at temperatures that require the air to be cooled before being directed to the turbine. In some turbofan gas turbine propulsion engines, a portion of the fan air flowing in the bypass duct may be continuously redirected and used to cool the extracted turbine cooling air. During some operational levels of the turbofan engine, fan air is not needed to adequately cool the extracted air, resulting in parasitic losses.

Hence, there is a need for a system that will ensure the flow rate of redirected fan air is sufficient to adequately cool air that is extracted for turbine cooling air, while substantially reducing, if not eliminating, parasitic engine losses. The present invention addresses at least this need.

BRIEF SUMMARY

In one embodiment, a system for supplying turbine cooling air flow includes a turbofan engine, a heat exchanger, and a door. The turbofan engine includes an engine case and a bypass flow passage. The engine case has an inner volume within which at least a gas turbine engine is mounted, and the bypass flow passage is defined by an outer fan duct and an inner fan duct and is configured to direct fan air flow therethrough. The heat exchanger is disposed within the turbofan engine and includes a heat exchanger first flow passage and a heat exchanger second flow passage. The heat exchanger first flow passage is coupled to receive fluid from within the engine case. The heat exchanger second flow passage is coupled to selectively receive cooling air from a cooling air source disposed within the turbofan engine. The heat exchanger is configured to transfer heat between the fluid and the cooling air. The door is movably mounted in the turbofan engine and is movable between a closed position, in which the cooling air will not flow into the heat exchanger second flow passage, and an open position, in which the cooling air may flow into the heat exchanger second flow passage.

In another embodiment, a system for supplying turbine cooling air flow includes a turbofan engine, a heat exchanger, and a door. The turbofan engine includes an engine case and a bypass flow passage. The engine case has an inner volume within which at least a gas turbine engine is mounted, and the bypass flow passage is defined by an outer fan duct and an inner fan duct and configured to direct fan air flow therethrough. The heat exchanger is disposed within the inner fan duct and includes a heat exchanger first flow passage and a heat exchanger second flow passage. The heat exchanger first flow passage is coupled to receive engine air from within the engine case, the heat exchanger second flow passage is coupled to selectively receive fan air from the bypass flow passage, and the heat exchanger is configured to transfer heat between the engine air and the fan air. The door is movably mounted in the inner fan duct and is movable between a closed position, in which the cooling air will not flow into the heat exchanger second flow passage, and an open position, in which the cooling air may flow into the heat exchanger second flow passage.

In yet another embodiment, a system for supplying turbine cooling air flow includes a turbofan engine, a plurality of heat exchangers, and a plurality of doors. The turbofan engine includes an engine case and a bypass flow passage. The engine case has an inner volume within which at least a gas turbine engine is mounted. The bypass flow passage is defined by an outer fan duct and an inner fan duct and configured to direct fan air flow therethrough. Each heat exchanger includes a heat exchanger first flow passage and a heat exchanger second flow passage. Each heat exchanger first flow passage is coupled to receive engine air from within the engine case, each heat exchanger second flow passage is coupled to selectively receive fan air from the bypass flow passage, and each heat exchanger is configured to transfer heat between the engine air and the fan air. Each door is associated with one of the heat exchangers and is movably mounted on the inner fan duct. Each door is movable between a closed position, in which fan air will not flow into the associated heat exchanger second flow passage, and an open position, in which fan air may flow into the associated heat exchanger second flow passage.

Furthermore, other desirable features and characteristics of the system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description. In this regard, although the system for directing air flow that is described herein is done so in the context of a turbofan gas turbine propulsion engine, the system is not limited to this application. Indeed, it may be implemented in numerous applications to improve performance. Some non-limiting examples include auxiliary power units and environmental control systems.

Figure 1:
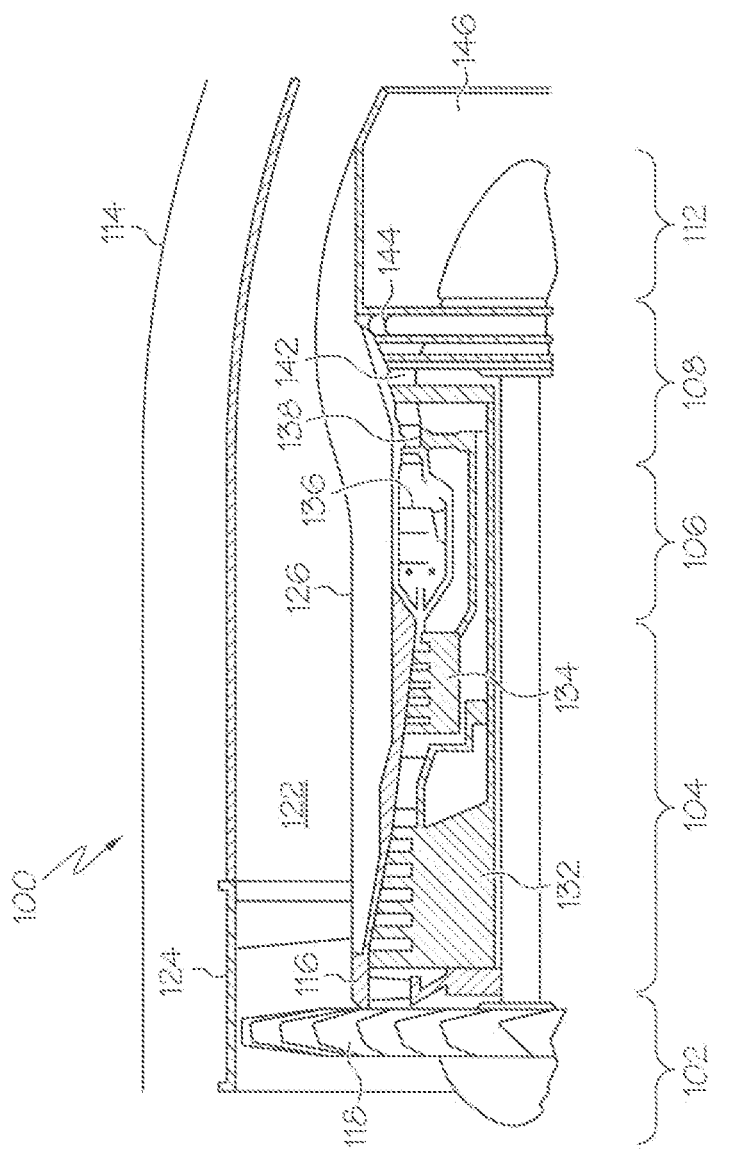
FIG. 1 depicts a simplified cross section view of a portion of a turbofan gas turbine propulsion engine.

Referring now to FIG. 1, a simplified cross section view of a turbofan gas turbine propulsion engine 100 is depicted. The depicted engine 100 includes an intake section 102, a compressor section 104, a combustion section 106, a turbine section 108, and an exhaust section 112. The intake section 102, compressor section 104, combustion section 106, turbine section 108, and exhaust section 112 are all mounted within a nacelle 114. The compressor section 104, combustion section 106, and turbine section 108 are all mounted within an engine case 116.

The intake section 102 includes a fan 118, which draws air into the engine 100 and accelerates it. A fraction of the accelerated fan air that is exhausted from the fan 118 is directed through a fan air bypass duct 122 that is defined by an outer fan duct 124 that is spaced apart from and surrounds an inner fan duct 126. Most of the fan air that flows through the fan air bypass duct 122 is discharged from the bypass duct 122 to generate a forward thrust. As will be described further below, in some embodiments, a portion of the fan air in the fan air bypass duct 122 is selectively supplied to a heat exchanger (not depicted in FIG. 1). The fraction of fan air that does not flow into the fan air bypass duct 122 is directed into the compressor section 104.

The compressor section 104 can include one or more compressors. The engine 100 depicted in FIG. 1 includes two compressors—an intermediate pressure compressor 132 and a high pressure compressor 134. No matter the number of compressors it includes, the air that is directed into the compressor section 104 is pressurized to a relatively high pressure. As will be described further below, in some alternative embodiments, a portion of the fan air that is directed into the compressor section 104 is selectively supplied from an input stage of the intermediate pressure compressor 132 to the above-mentioned heat exchanger.

The relatively high pressure air that is discharged from the compressor section 104 is directed into the combustion section 106. The combustion section 106 includes a combustor 136 that is coupled to receive both the relatively high pressure air and atomized fuel. The relatively high pressure air and atomized fuel are mixed within the combustor 136 and the mixture is ignited to generate combusted air. The combusted air is then directed into the turbine section 108.

The depicted turbine section 108 includes three turbines—a high pressure turbine 138, an intermediate pressure turbine 142, and a low pressure turbine 144—though it should be appreciated that any number of turbines may be included. The combusted air directed into the turbine section 108 expands through each of turbines 138, 142, 144, causing each to rotate. The air is then exhausted through a propulsion nozzle 146 disposed in the exhaust section 112 to provide addition forward thrust. As the turbines 138, 142, 144 rotate, each drives equipment in the gas turbine engine 100 via concentrically disposed shafts or spools as best seen in FIG. 1.

During operation, the temperatures within various portions of the engine 100 may reach relatively high temperatures. Thus, as depicted more clearly in FIG. 2, the engine 100 additionally includes a cooling air system 200 to provide cooling air to these various components within the engine 100. The cooling air system 200 extracts relatively hot air 202 from within the engine case 116, directs the relatively hot air 202 through a heat exchanger 204 to be selectively cooled, and then directs the selectively cooled air 206 back into the engine case 116 to provide cooling air to the various portions of the engine 100. In the embodiment depicted in FIG. 2, a portion of the fan air in the fan air bypass duct 122 is selectively supplied, via an inlet 214, to the heat exchanger 204. The selectively supplied fan air flows through the heat exchanger 204 to cool the relatively hot air 202 that is extracted from the engine case 116, and is then directed back into the fan air bypass duct 122.

Figure 2:
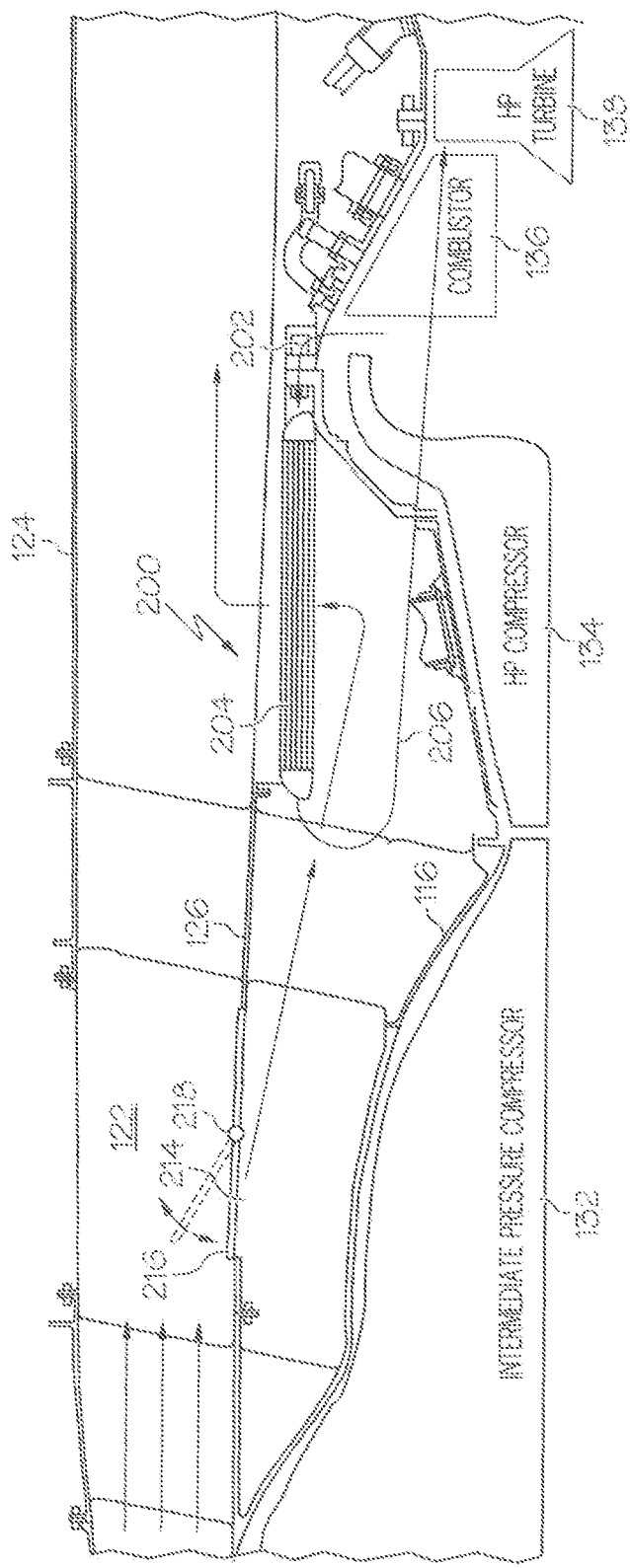
FIG. 2 depicts a close-up cross section view of a portion of the turbofan gas turbine engine of FIG. 1, illustrating an embodiment of a cooling air system.

In the embodiment depicted in FIG. 2, fan air is only selectively supplied to the heat exchanger 204 because of a door 216 that is movably mounted on the inner fan duct 126. The door 216 is movable between a closed position and an open position. In the closed position, which is the position depicted using solid lines FIG. 2, the door 216 prevents fan air from flowing through the inlet 214 and to the heat exchanger 204. In the open position, which is the position depicted using dashed lines in FIG. 2, fan air may flow through the inlet 214 and to the heat exchanger 204. The door 216 is preferably moved between the closed and open positions via an actuator 218. It will be appreciated that the actuator 218 may be implemented using any one of numerous types of passive or active actuator devices now known or developed in the future. If it is implemented using an active actuator device, the actuator 208, as may be appreciated, is responsive to power (electrical, pneumatic, or hydraulic) supplied from a suitable power source to move between the open and closed positions.

Figure 3:
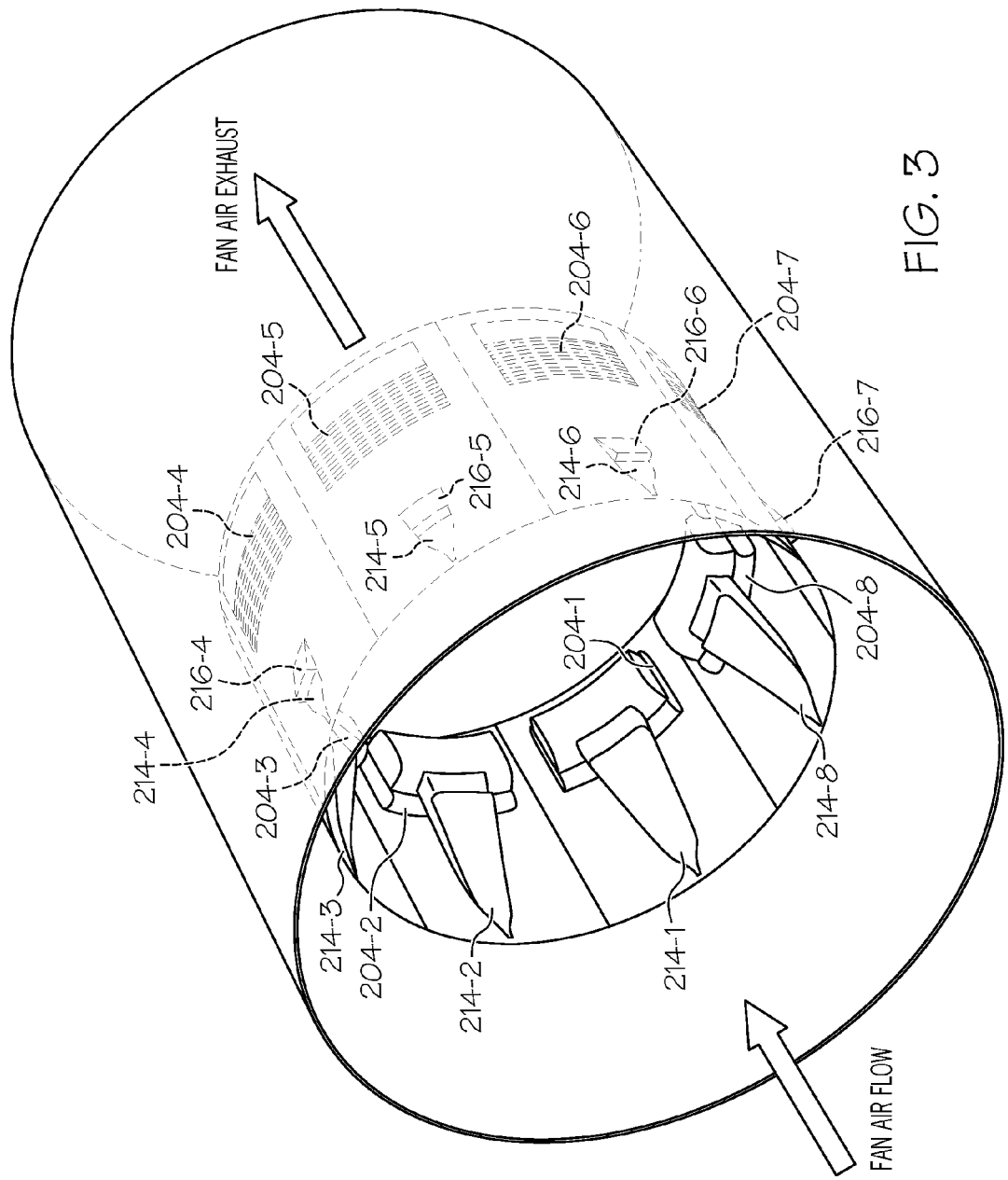
FIG. 3 depicts a simplified isometric view of inner and outer engine fan ducts, illustrating an arrangement of portions of the cooling air system depicted in FIG. 2.

For clarity and ease of illustration, only a single heat exchanger 204, inlet 214, and door 216 are depicted in simplified form in FIG. 2. However, as depicted more clearly in FIG. 3, the gas turbine engine 100 preferably includes a plurality of heat exchangers 204 (204-1, 204-2, 204-3, . . . , 204-8), a plurality of inlets 214 (214-1, 214-2, 214-3, . . . , 214-8) (not all of which are visible in FIG. 3), and a plurality of doors 216 (216-1, 216-2, 216-3, . . . , 216-8) (not all of which are visible in FIG. 3). Each of the inlets 214 and each of the doors 216 are associated with a different one of the heat exchangers 216. Moreover, each door 216 is movably mounted on the inner fan duct 126, and is independently movable between the closed position and the open position. Although the depicted embodiment is implemented with eight heat exchangers 204, eight inlets 216, and eight doors 216, it will be appreciated that this is merely exemplary of one embodiment, and that other numbers of heat exchangers 204, inlets 216, and doors 216 may be used.

Figure 4:
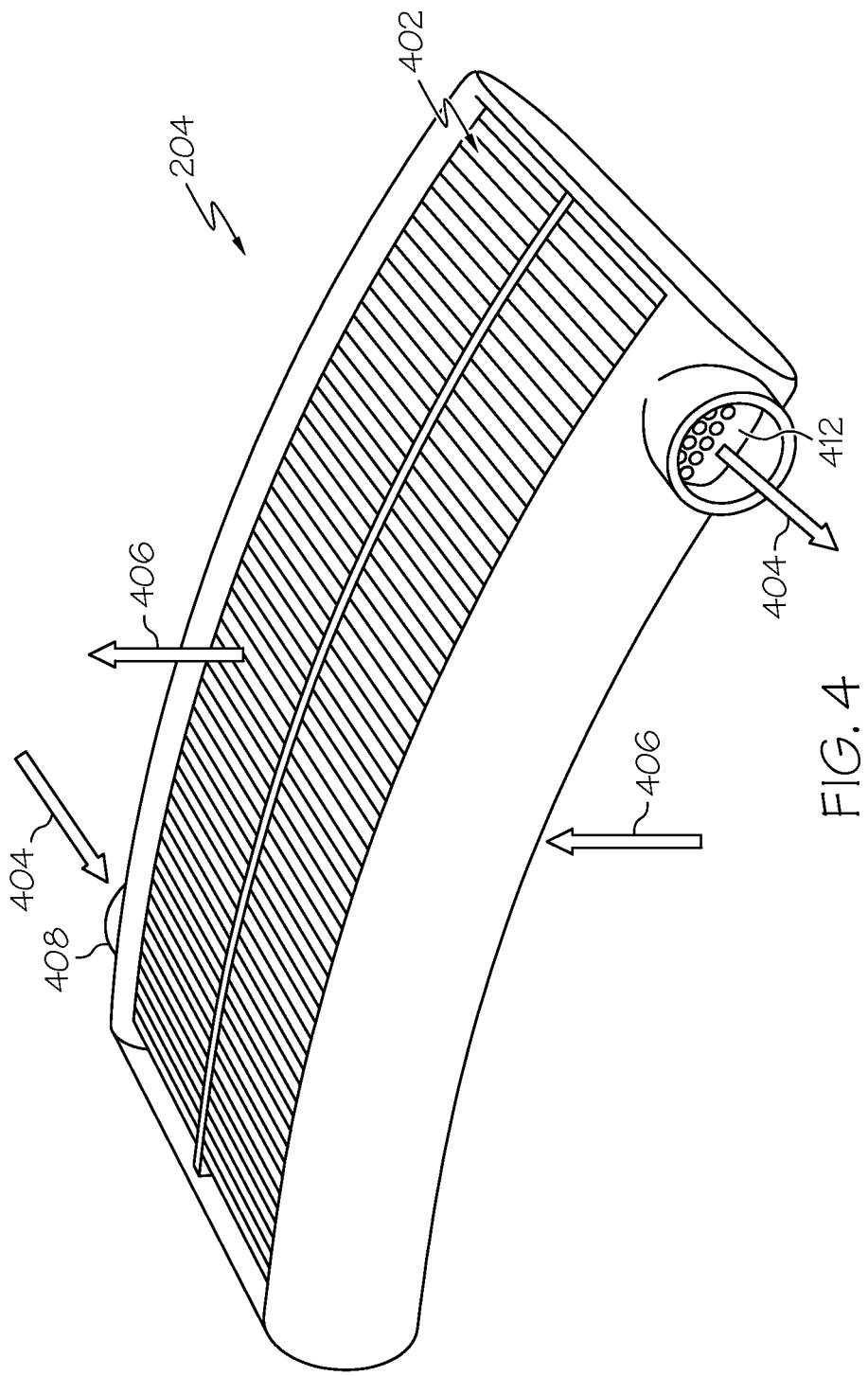
FIG. 4 depicts an embodiment of a heat exchanger that may be used to implement the cooling air system depicted in FIGS. 2 and 3.
Figure 5:
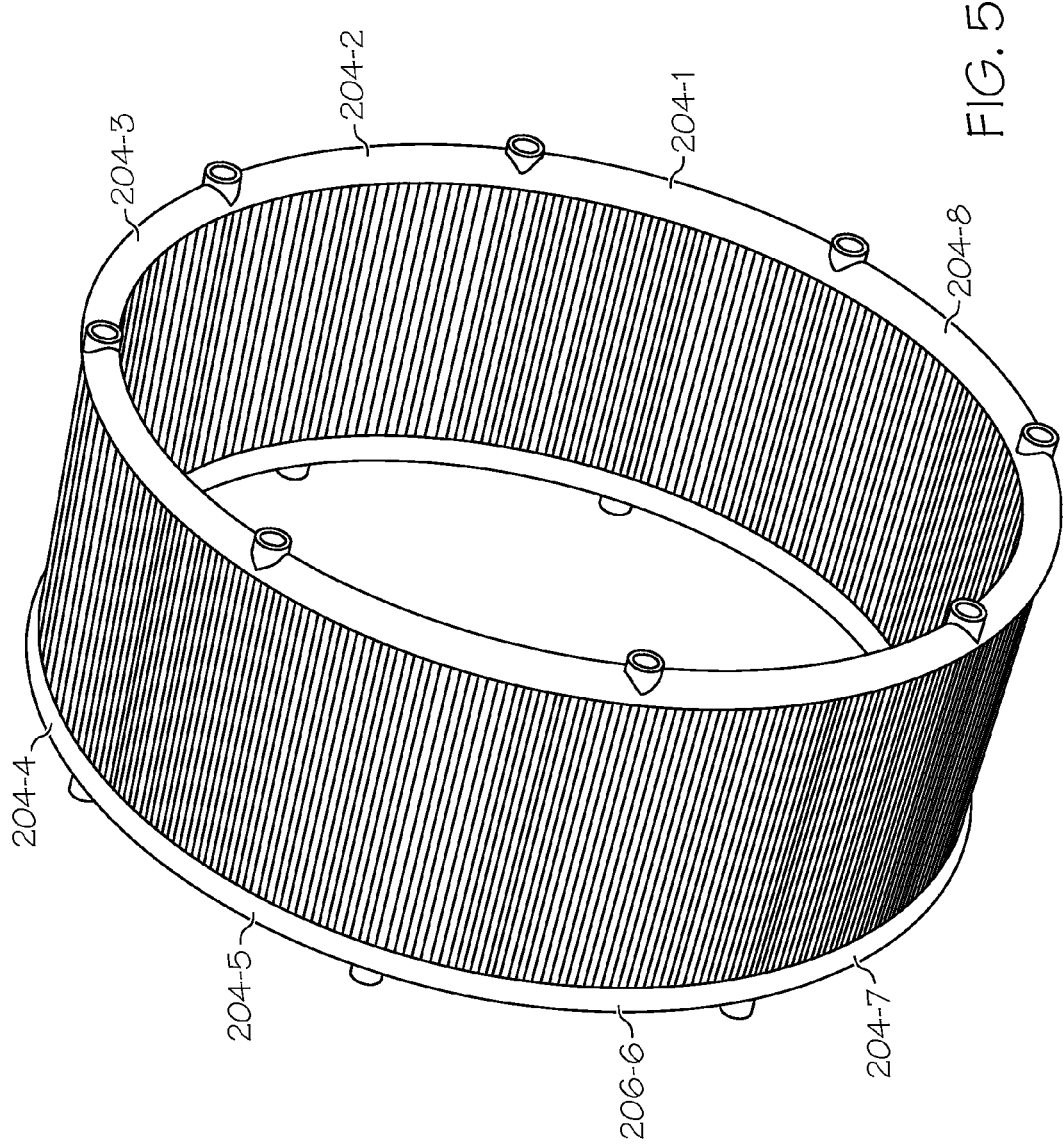
FIG. 5 depicts the heat exchanger of FIG. 4 coupled to other heat exchangers to form an annular ring.

No matter the specific number of heat exchangers 204 that are used, each heat exchanger 204, an embodiment of one of which is depicted more clearly in FIG. 4, is preferably implemented as a conformal heat exchanger. The heat exchangers 204 are conformal, in that each is disposed within and conforms to the curvature of the inner fan duct 126 and, as shown most clearly in FIG. 5, the heat exchangers 204 are preferably coupled together to form an annular ring. This configuration minimizes the installation space, minimizes transmission pressure loss, and maximizes the differential pressure across the heat exchanger 204.

The heat exchangers 204 are each configured to transfer heat between the relatively hot air 202 and the fan air, and may be implemented using any one of numerous types of heat exchangers. In the depicted embodiment, and with reference once again to FIG. 4, each heat exchanger 204 is implemented as a tubular bundle type that includes plurality of tubes 402, a heat exchanger first flow passage 404, and a heat exchanger second flow passage 406. Each heat exchanger first flow passage 404 includes an inlet port 408 and an outlet port 412. Each inlet port 408 is coupled to receive the relatively hot air 202 from within the engine case 116, and each heat exchanger second flow passage 406 is coupled to selectively receive fan air from the bypass flow passage 122. The relatively hot air 202 that flows into the heat exchanger inlet ports 408, flows into and through the associated tubes 402, where it is selectively cooled, and the selectively cooled air 206 is discharged out the associated outlet port 412.

Each heat exchanger second flow passage 406 is configured to direct the selectively supplied fan air across the associated tubes 402. As may be appreciated, when a door 216 is closed, fan air will not flow into the associated heat exchanger second flow passage 406, and thus will not cool the relatively hot air 202 flowing through the tubes 402. When, however, a door 216 is open, fan air may flow into the associated heat exchanger second flow passage 406, over the tube bundle 402 in a single pass, and back into the bypass duct 122, thus cooling the relatively hot air 202 flowing through the tubes. It will be appreciated that the configuration of the heat exchangers 204 allows each to be configured such that the fan air flow may be either cross flow, counter flow, or a combination of both.

The actuators 218, as previously noted, are each configured to move its associated door 216 between the closed and open positions via an actuator 218, and may be implemented using any one of numerous types of passive or active actuator devices. No matter the specific implementations, each actuator 218 is preferably configured to move its associated door 216 to an open position when the temperature of the relatively hot air 202 is at or above a first predetermined temperature, and to the closed position when the temperature of the relatively hot air 202 is at or below a second predetermined temperature. The first and second predetermined temperatures may be any one of numerous temperatures. It will be appreciated that the actuators 218 can be discretely controlled to move the associated doors 216 between the closed positions and single open positions, or the actuators 218 can be controlled to modulate the positions of the associated doors 216.

Figure 6:
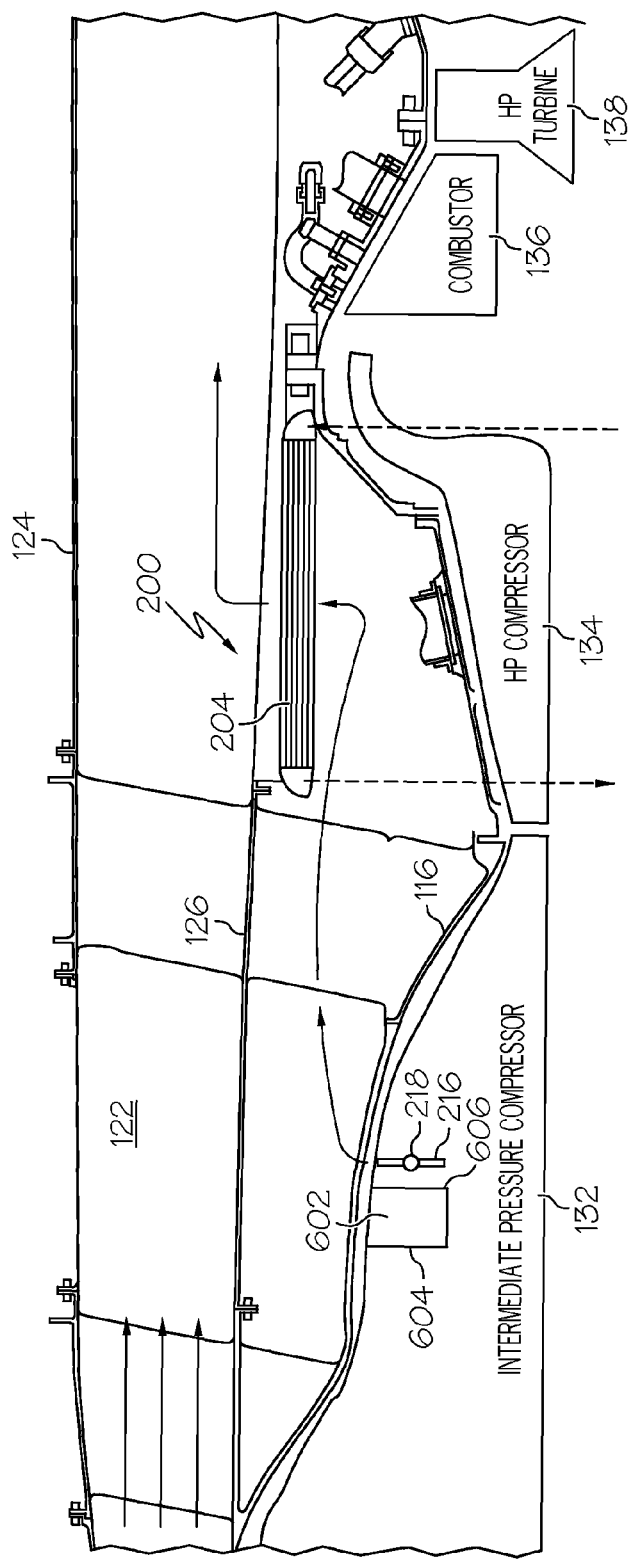
FIG. 6 depicts alternative embodiments of the cooling system depicted in FIG. 2.

When the gas turbine engine 100 depicted in FIG. 1 was being described, it was noted that in some alternative embodiments a portion of the fan air that is directed into the compressor section 104 may be selectively supplied from an input stage of the intermediate pressure compressor 132 to the heat exchanger(s) 204. This alternative embodiment is depicted in FIG. 6, in which the door(s) 216 is (are) movably mounted to the compressor section 104. More specifically, the intermediate pressure compressor 132, as is generally known, includes one or more non-rotating stator elements 602, each having a leading edge 604 and a trailing edge 606. The door(s) 216 is (are) mounted adjacent the stator 602 and, when open, allows fan booster stage air from the leading edge 604 of the stator 602 to provide the source of cooling air supplied to the heat exchanger 204.

It is further noted that the configurations described herein may be used to cool engine oil instead of turbine cooling air. Such an embodiment is also depicted in in FIG. 6, in which the dashed lines into and out of the heat exchanger first flow path 404 represent the flow of engine oil to and from one or more lubricant loads within the engine 100.

The systems described herein ensure that the flow rate of fan air that is redirected from the bypass section of a turbofan gas turbine engine is sufficient to adequately cool air that is extracted for turbine cooling air, while substantially reducing, if not eliminating, parasitic engine losses. The systems may be implemented as packaged modules, or fully integrated into the turbofan gas turbine engine structure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for supplying turbine cooling air flow, comprising:
   a turbofan engine including an engine case and a bypass flow passage, the engine case having an inner volume within which at least a gas turbine engine is mounted, the bypass flow passage defined by an outer fan duct and an inner fan duct and configured to direct fan air flow therethrough;
   a plurality of heat exchangers disposed within the turbofan engine, each heat exchanger including a heat exchanger first flow passage and a heat exchanger second flow passage, each heat exchanger first flow passage coupled to receive engine air from within the engine case, each heat exchanger second flow passage coupled to selectively receive fan air from the bypass flow passage, each heat exchanger configured to transfer heat between the engine air and the fan air;

a plurality of doors, each door associated with one of the heat exchangers and movably mounted on the inner fan duct, each door independently movable between a closed position, in which fan air will not flow into its associated heat exchanger second flow passage, and an open position, in which fan air will flow into its associated heat exchanger second flow passage; and a plurality of door actuators, each door actuator coupled to a different one of the doors and configured to independently move the door to which it is coupled between the closed and open positions.

2. The system of claim 1, wherein each door actuator comprises a passive actuator.

3. The system of claim 1, wherein each door actuator is responsive to power from a power source to move between the open and closed positions.

4. The system of claim 1, wherein:

each heat exchanger is disposed within the inner fan duct and is shaped to conform to at least a portion of the inner fan duct; and the heat exchangers are coupled together to form an annular ring.

* * * * *